(12) United States Patent
Zhou

(10) Patent No.: US 9,307,555 B2
(45) Date of Patent: Apr. 5, 2016

(54) METHOD AND SYSTEM FOR MOBILE TERMINAL TO ACCESS THE NETWORK THROUGH CELL PHONE

(71) Applicant: HUIZHOU TCL MOBILE COMMUNICATION CO., LTD, Huizhou (CN)

(72) Inventor: Dan Zhou, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 167 days.

(21) Appl. No.: 14/369,458

(22) PCT Filed: Dec. 25, 2012

(86) PCT No.: PCT/CN2012/087430
§ 371 (c)(1),
(2) Date: Jun. 27, 2014

(87) PCT Pub. No.: WO2013/104252
PCT Pub. Date: Jul. 18, 2013

(65) Prior Publication Data
US 2015/0016439 A1   Jan. 15, 2015

(30) Foreign Application Priority Data

Jan. 12, 2012  (CN) .......................... 2012 1 0008792

(51) Int. Cl.
*H04W 4/00* (2009.01)
*H04W 74/00* (2009.01)
(Continued)

(52) U.S. Cl.
CPC .......... *H04W 74/002* (2013.01); *H04L 45/7453* (2013.01); *H04L 61/2007* (2013.01);
(Continued)

(58) Field of Classification Search
CPC ..... H04L 67/1097; H04L 45/00; H04L 45/54; H04L 45/745; H04L 12/1475; H04L 67/2842; H04L 67/02; H04L 67/042; H04L 67/10; H04L 67/289; H04L 45/7453; H04L 61/2007; H04L 61/256; H04W 76/023; H04W 88/04; H04W 88/06; H04W 12/06; H04W 12/08; H04W 88/16; H04W 84/12; H04W 74/002; H04W 64/00; H04W 24/00; H04B 5/0031; H04M 1/72572

See application file for complete search history.

(56) References Cited

U.S. PATENT DOCUMENTS 7,382,771 B2 *   6/2008   Leblanc ................... H04L 29/06
                                                          370/328
7,702,357 B2 *   4/2010   Yam ....................... H04W 36/14
                                                          370/338

(Continued)

*Primary Examiner* — Brian O'Connor
(74) *Attorney, Agent, or Firm* — Shimokaji IP

(57) ABSTRACT

A method for a mobile terminal to access a network through a cell phone is provided. The mobile terminal may be connected to a network enabled cell phone via a WIFI (wireless fidelity) connection mode, and the network enabled cell phone may serve as a gateway router. TCP/IP (transmission control protocol/internet protocol) operating principle having element information, such as source address, source port, protocol, destination address and destination port in a data packet, may be processed when a data packet arrives at a network layer of a network enabled cell phone. A Hash table may be dynamically established for searching a network connection, and NAT (network address translation) treatment may be carried out to a data packet, thus, an associated mobile terminal may simultaneously access the network with the network enabled cell phone by the external network IP address of the network enabled cell phone. Because the two devices may share an IP address to access the network, all the network flow may be generated at the gateway cell phone, thus, avoiding cost of other devices. Furthermore, a Hash table may be dynamically established for the data packet in the present invention, which may accelerate search speed of a data packet and processing speed.

20 Claims, 4 Drawing Sheets

(51) Int. Cl.
*H04L 29/06* (2006.01)
*H04L 12/743* (2013.01)
*H04L 29/12* (2006.01)
*H04M 1/253* (2006.01)
*H04W 8/26* (2009.01)
*H04W 84/12* (2009.01)

(52) U.S. Cl.
CPC ............ *H04L61/256* (2013.01); *H04L 65/104* (2013.01); *H04M 1/2535* (2013.01); *H04W 8/26* (2013.01); *H04L 61/2514* (2013.01); *H04W 84/12* (2013.01)

(56) References Cited

U.S. PATENT DOCUMENTS

| | | | | |
|---|---|---|---|---|
| 7,940,768 B2 * | 5/2011 | Masputra | ................ | H04L 45/00 370/392 |
| 7,995,516 B2 * | 8/2011 | Zhou | ................ | H04L 12/46 370/328 |
| 8,064,418 B2 * | 11/2011 | Maki | ................ | H04W 12/06 370/338 |
| 8,064,455 B2 * | 11/2011 | Masputra | ................ | H04L 45/00 370/392 |
| 8,108,524 B2 * | 1/2012 | Donzis | ................ | H04L 45/742 455/414.3 |
| 8,611,242 B2 * | 12/2013 | Deu-Ngoc | ............. | H04L 43/16 370/252 |
| 8,804,517 B2 * | 8/2014 | Oerton | ................ | H04W 4/001 370/235 |
| 8,837,483 B2 * | 9/2014 | Bu | ................ | H04L 61/2514 370/392 |
| 8,958,298 B2 * | 2/2015 | Zhang | ................ | H04L 47/12 370/235 |
| 9,059,999 B2 * | 6/2015 | Koponen | ................ | H04L 47/12 |
| 9,185,069 B2 * | 11/2015 | Koponen | ................ | H04L 47/12 |
| 2011/0294502 A1 * | 12/2011 | Oerton | ................ | H04W 4/001 455/426.1 |
| 2013/0151676 A1 * | 6/2013 | Thakkar | ................ | H04L 47/12 709/220 |

* cited by examiner

METHOD AND SYSTEM FOR MOBILE TERMINAL TO ACCESS THE NETWORK THROUGH CELL PHONE

TECHNICAL FIELD

The present disclosure relates to mobile communications, and in particular to methods and systems for a mobile terminal to access a network through a cell phone.

BACKGROUND

Accessing a network through a cell phone has become a part of public life. People may browse news, listen to music or watch videos online using a cell phone, etc. However, some cell phones, without enabling a network service, cannot access a network due to an influence of network flow. Moreover, a first cell phone cannot generally be operated through a network via other cell phones. In addition, computers generally access a network through a cell phone via dial-up form and corresponding dialing software is required to be installed on the PC. Furthermore, when a PC is dialing, an associated cell phone cannot carry out network connection.

SUMMARY

Methods are provided for a mobile terminal, that includes WiFi capability, to access a network through a network enabled cell phone using a network address translation (NAT).

A method for a mobile terminal to access a network through a cell phone may include pre-establishing a connection management Hash table that tags a network address mapping relationship in a network enabled cell phone, wherein a Hash value in the connection management Hash table is equal to a modulus table length of a binary sum of a source address, a protocol type, a source port and a destination port. The method may also include establishing, by a mobile terminal, a point-to-point communication connection with the network enabled cell phone through WIFI, and sending a data packet of a destination server to the network enabled cell phone, extracting, by the network enabled cell phone, an element group in the data packet at a network layer and saving the element group in a tuple structure, wherein the element group comprises a source address, a source port, a protocol type, a destination address and a destination port of the data packet, and carrying out, by the network enabled cell phone, source address NAT treatment on the element group, translating the source address of the data packet to an IP address for the dial-up networking of the cell phone, and distributing a dial-up networking port. The method may further include connecting the network enabled cell phone to the destination server to communicate according to information of the treated element group.

A method for a mobile terminal to access a network through a cell phone may also include searching, by a network enabled cell phone, a connection management Hash table according to an element group, determining whether a connection structure of a mobile terminal and a destination server exists in a connection management Hash table, defining a data packet as a first data packet and establishing a new connection structure in the Hash table if a connection structure does not exist in the connection management Hash table.

A method for a mobile terminal to access a network through a cell phone may also include extracting connection management information represented by a connection structure, monitoring whether a current network requires FTP extension monitoring, updating a current connection management status, and carrying out NAT treatment on a data packet to realize communications between a mobile terminal and a destination server if a connection structure exists in a connection management Hash table.

A method for a mobile terminal to access a network through a cell phone may further include saving an element group after being subjected to source address NAT treatment in the connection management Hash table in a form of tuple structure.

A method for a mobile terminal to access a network through a cell phone may also include determining whether a data packet is data connection of other FTP control chains according to a new connection structure if a protocol in an element group is an FTP protocol, and carrying out destination address NAT treatment on the element group in the data packet if the data packet is the data connection of other FTP control chains.

A method for a mobile terminal to access a network through a cell phone, when sending, by a destination server, a returned data packet to the mobile terminal, may include sending a returned data packet to a network enabled cell phone first, extracting, by the network enabled cell phone, an element group in a returned data packet and searching a connection management Hash table to find a corresponding tuple structure, modifying the returned data packet according to the tuple structure and sending the modified returned data packet to the mobile terminal.

A system for a mobile terminal to access a network through a cell phone may include a mobile terminal and a network enabled cell phone.

A mobile terminal may establish a point-to-point communication connection with a network enabled cell phone through WiFi, and send a data packet of a destination server to the network enabled cell phone.

A network enabled cell phone may be used for extracting an element group in a data packet sent by a mobile terminal at a network layer and saving an element group in a tuple structure; wherein, the element group comprises a source address, a source port, a protocol type, a destination address and a destination port of the data packet. Moreover, a network enabled cell phone may be used for carrying out source address NAT treatment on an element group, translating a source address of a data packet to an IP address for a dial-up networking of the cell phone, and distributing a dial-up networking port, and connecting to a destination server to communicate according to information of the treated element group.

A destination server may be used for communicated with a mobile terminal and a network enabled cell phone.

A network enabled cell phone may include a Hash table establishing management module for pre-establishing a connection management Hash table for tagging a network address mapping relationship in a network enabled cell phone, wherein a Hash value in the connection management Hash table is equal to a modulus table length of a binary sum of a source address, a protocol type, a source port and a destination port.

A system for a mobile terminal to access a network through a cell phone may include a network enabled cell phone for searching a connection management Hash table according to an element group, determining whether a connection structure of the mobile terminal and a destination server exists in the connection management Hash table, defining a data packet as a first data packet and establishing a new connection structure in the Hash table if the connection structure does not exist in the connection management Hash table.

A system for a mobile terminal to access a network through a cell phone may include a network enabled cell phone for extracting connection management information represented by a connection structure, monitoring whether a current network requires FTP extension monitoring, updating a current connection management status, and carrying out NAT treatment on a data packet to realize communications between the mobile terminal and a destination server if the connection structure exists in the connection management Hash table.

Methods and systems for a mobile terminal to access a network through a cell phone may include a function of using one cell phone as a gateway to enable another cell phone having WiFi, or a computer having WiFi, to access the network through a gateway cell phone are provided by adopting NAT technology. Moreover, as two devices share an IP address to access the network, network flow may be generated at the gateway cell phone, thus avoiding utilization cost of other devices. Furthermore, a Hash table may be dynamically established for a data packet, which may accelerate search speed of a data packet and associated processing speed.

DETAILED DESCRIPTION

Figure 1:
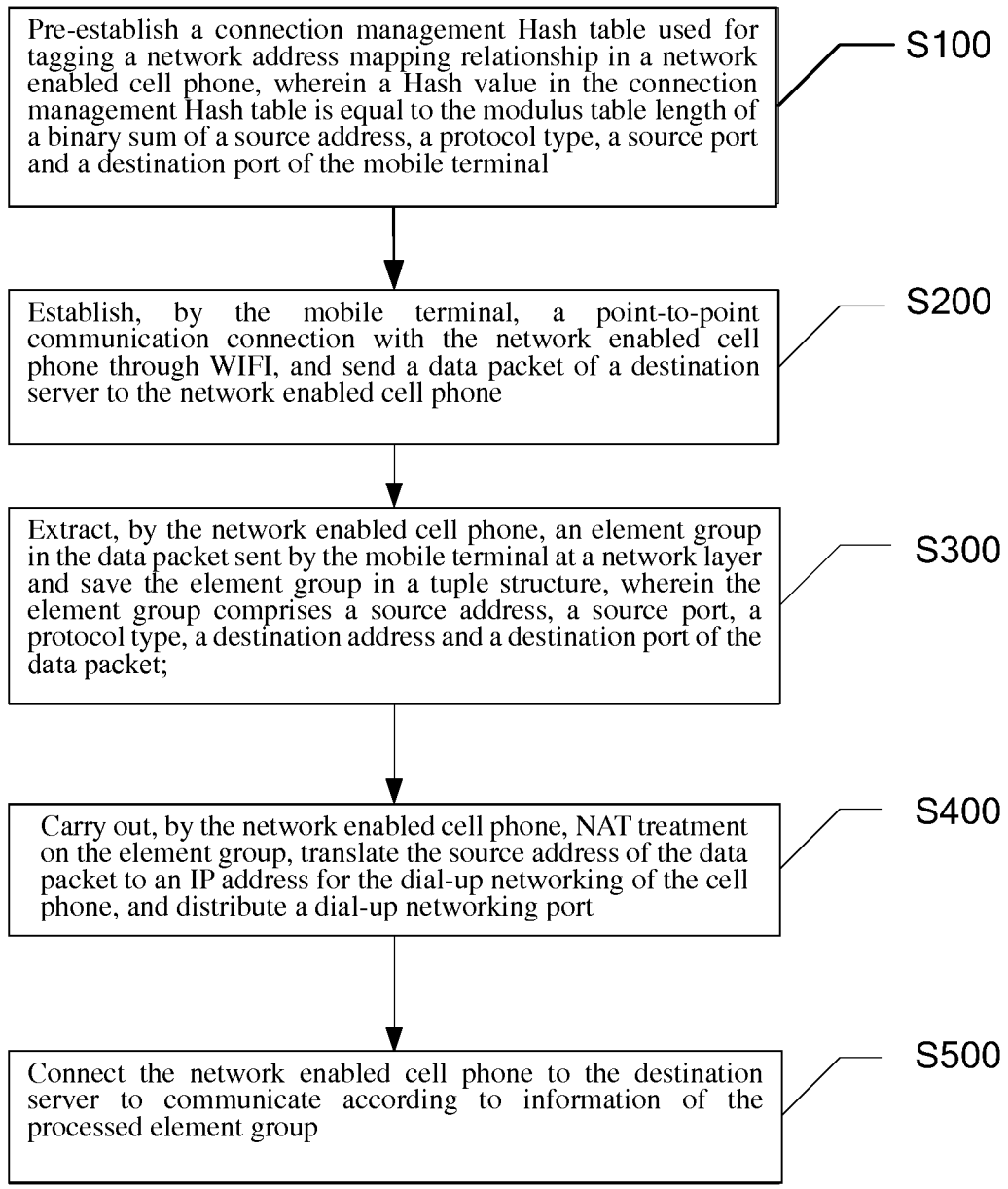
FIG. 1 depicts an example flow chart of a method for a mobile terminal to access a network through a cell phone.

To make the objectives, technical solutions and advantages of the claimed invention clear, the claimed invention is described in detail with reference to the drawings and specific embodiments. The specific embodiments described herein are included for illustrative purposes only and are not intended to limit the scope of the claimed invention in any way.

A mobile terminal may be connected to a network enabled cell phone via a WIFI connection and the network enabled cell phone may serve as a gateway router. An associated TCP/IP operating principle may use element information, such as source address, source port, protocol, destination address and destination port in a data packet. Element information may be processed when a data packet arrives at a network layer of a network enabled cell phone and a Hash table may be dynamically established for searching a network connection.

Network address translation (NAT) treatment may be carried out to a data packet, thus a mobile terminal may simultaneously access a network along with a network enabled cell phone by an external network IP address of the network enabled cell phone.

NAT (Network Address Translation) refers to translation of one address of an IP datagram into another address, so that a plurality of IP addresses share one IP address for connection.

A method for a mobile terminal to access a network through a cell phone may include pre-establish a connection management Hash table for tagging a network address mapping relationship in a network enabled cell phone, wherein a Hash value in the connection management Hash table is equal to a modulus table length of a binary sum of a source address, a protocol type, a source port and a destination port. A binary of the source address, the protocol type, the source port and the destination port of the mobile terminal may be summed and then a modulus operation may be carried out according to the table length of the Hash table. The Hash value may be equal to the value after carrying out the modulus operation. The method may also include establish, by a mobile terminal, a point-to-point communication connection with the network enabled cell phone through WIFI, and sending a data packet of a destination server to the network enabled cell phone. The method may further include extracting, by the network enabled cell phone, an element group in the data packet sent by the mobile terminal at a network layer and saving the element group in a tuple structure, wherein the element group may include a source address, a source port, a protocol type, a destination address and a destination port of the data packet. The method may also include carrying out, by the network enabled cell phone, source address NAT treatment on the element group, translating the source address of the data packet to an IP address for the dial-up networking of the cell phone, and distributing a dial-up networking port, wherein, the element group, after being subjected to source address NAT treatment, is saved in the connection management Hash table in a form of tuple structure. The method may further include connecting the network enabled cell phone to the destination server to communicate according to information of the NAT treated element group.

A method for a mobile terminal to access a network through a cell phone may include searching, by a network enabled cell phone, a connection management Hash table according to an element group, determining whether a connection structure of the mobile terminal and a destination server exists in a connection management Hash table, defining a data packet as a first data packet and establishing a new connection structure in the Hash table if the connection structure does not exist in the connection management Hash table. The method may further include extracting connection management information represented by the connection structure, monitoring whether a current network requires FTP extension monitoring, updating a current connection management status, and carrying out NAT treatment on the data packet to realize communications between the mobile terminal and the destination server if the connection structure exists in the connection management Hash table.

A method for a mobile terminal to access a network through a cell phone may include determining whether a data packet is data connection of other FTP control chains according to a new connection structure if a protocol in an element group is an FTP protocol, and carrying out destination address NAT treatment on the element group in the data packet if the data packet is a data connection of other FTP control chains.

A method for a mobile terminal to access a network through a cell phone may include sending a returned data packet to a network enabled cell phone first extracting, by a network enabled cell phone, an element group in a returned data packet and searching a connection management Hash table to find a corresponding tuple structure, modifying the returned data packet according to the tuple structure and sending a modified returned data packet to the mobile terminal.

Figure 2:
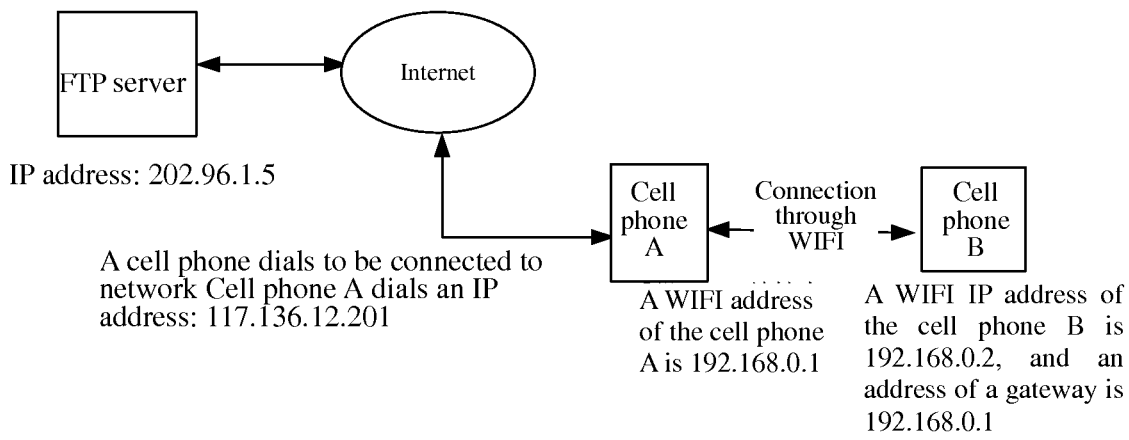
FIG. 2 depicts an example schematic view of a network structure taking FTP connection.

An entire networking implementation process may be analyzed by an FTP connection, for example, as shown in the networking structure schematic view in FIG. 2.

An IP address for a dial-up networking of a network enabled cell phone A may be defined as 117.136.12.201, an IP address of a WIFI network card may be defined as 192.168.0.1, and an address of an FTP server may be defined as 202.96.1.5. If another cell phone B having an IP address of 192.168.0.2, that takes the network enabled cell phone A as a gateway, needs to access a server having an IP address of 202.96.1.5, a source port may be defined as 2345 and a destination port may be defined as 21. Subsequently, when a data packet is sent from the cell phone B to the cell phone A through a point-to-point network connection of the cell phone and arrives at a network layer of the cell phone A, the cell phone A may extract an element group of a current data packet to form a new tuple structure. As a result, an IP composition of the tuple structure is:

tuple.strcip=192.168.0.2 tuple.strport_id=2345 tuple.dstip=202.96.1.5 tuple.dstport=21 tuple.proto=tcp.

Connection management currently existing in the connection management Hash table may then be searched according to contents of the element group. Notably, a corresponding connection cannot be found according to an IP composition. An index of an unused connection management table may be distributed for the data packet, and whether the connection is an extension chain of other connections may be searched.

When information of an extension chain cannot be found, destination address NAT (DNAT) treatment may not be required. However, because the data packet was sent from a WIFI port, source address NAT (SNAT) treatment may be carried out on the data packet. The source address 192.168.0.2 may be translated into a dial-up networking address 117.136.12.201 of the cell phone A. Moreover, a transmission port 7890 may be distributed for the data packet. Then, the packet sent to the network may be 117.136.12.201:7890 - - - → 202.96.1.5:21. At this time, a tuple structure in the response direction may be:

reply_tuple.strip=202.96.1.5 reply_tuple.strport_id=21 reply_tuple.dstip=117.136.12.201 reply_tuple.dstport=7890 reply_tuple.proto=tcp.

Thereafter, two tuple structures may be saved in the connection management Hash table, and contents of the data packet may be modified. For example, the data packet may be modified as 117.136.12.201:7890 - - - → 202.96.1.5:21.

A second data packet (202.96.1.5:21 - - - → 117.136.12.201:7890 syn+ack) may be defined. The FTP server may send the second data packet to the cell phone B. The FTP server may first send the second data packet to the network enabled cell phone A. The network enabled cell phone A, after receiving the second data packet, may extract an element group from the data packet to form a new tuple structure, which may be represented as:

tuple.strcip=202.96.1.5 tuple.strport_id=21 tuple.dstip=117.136.12.201 tuple.dstport=7890 tuple.proto=tcp.

The network enabled cell phone A may search the connection management Hash table according to the tuple structure, and may find a tuple structure matched thereof, and may then detect whether connection contents are included in the tuple structure. If the tuple structure does not have the connection contents, then the data packet may be modified as :202.96.1.5:21 - - - → 192.168.0.2:2345 according to the foregoing NAT information, and the data packet may then be sent to the cell phone B. Afterwards, the connection contents may be updated.

Further, if a user wants to download files from the FTP server, the FTP server may send a section of the data packet contents to the user, for example: 227 Entering Passive Mode (202, 96.4, 1, 5, 89).

A treatment flow may be as follows:

The foregoing second data packet (202.96.1.5:21 - - - → 117.136.12.201:7890 syn+ack) may be sent to the network enabled cell phone A by the FTP server. The network enabled cell phone A, after receiving the data packet, may extract an element group in the data packet to form a new tuple structure, which may be represented as:

tuple.strcip=202.96.1.5 tuple.strport_id=21 tuple.dstip=117.136.12.201 tuple.dstport=7890 tuple.proto=tcp.

The network enabled cell phone A, by searching the connection management Hash table according to the tuple structure, may find the corresponding tuple structure and detect that the current data packet is the data packet in the answering direction. Moreover, the current connection may be an FTP connection having an extension chain. For example, a character string 227 and a PROT field may be matched to extract an IP address and a port of the new connection, wherein the tuple structure extracted may be:

New_tuple.dstip=202.96.1.5

New_tuple.port=5*256+89=1369

New_tuple.srcip=192.168.0.2

New_tuple.proto=tcp.

An idle connection may be extracted from an extension chain structure table and distributed to this connection, and the two connections may be associated.

Further, another data packet may be sent from the cell phone B to the FTP server, which may be represented as: 192.168.0.2:8989 - - - → 202.96.1.5: 1369. The network enabled cell phone A may, after receiving the data packet, extract an element group from the data packet to form a new tuple structure, which may be represented as:

tuple.strcip=192.168.0.2 tuple.strport_id=8989 tuple.dstip=202.96.1.5 tuple.dstport=1369 tuple.proto=tcp.

A connection management, currently existing in the connection management Hash table, may be searched according to the contents of the element group. Because, in these circumstances, a corresponding connection cannot be found, an index of an unused connection management table may be distributed for the data packet, and whether the connection is an extension chain of other connections may be checked. Because the information may already be added into an extended connection management Hash table when searching the extension chain according to the element group, it can be found that this connection is the extension chain of other connections. This connection may be bound with the connection established when the FTP server transmits a downloaded data packet to the cell phone B. Because this connection may be an extension chain, NAT information of a truck chain table may be read. If this connection is of a PORT type, information of DNAT may be obtained. Because this connection may be of a 227 type, DNAT treatment may not be needed according to the information of the truck chain table. The data packet may be detected to be sent from a WIFI port. SNAT treatment may then be carried out, and the information of the trunk chain table may be read again to obtain the NAT information of the trunk chain table, may replace the information of this connection, and may adjust a new port according to whether the port is used. Subsequent treatment may be the same as treatment of the first data packet.

Further, an establishing and connection management process of the connection management Hash table may be.

A structure of a header Hash table (hash table) may be:

```
typedef __packed union hash_table
{
    Struct
    {
        i.  U32 mutex:10;
        ii. U32 next:22;
    };
    U32 value;
}u_hash_table;
```

The size of the Hash table may be MAX_CONNTRACK, and the Hash value=the entry number of (source IP of an initiator+a source IP protocol of the initiator+source port+destination port) % table (namely, the table length). When the protocol is an ICMP protocol, the destination port may adopt protocol type and code to evaluate.

The hash table of the connection management information may be an empty row, may be eventuated as u_ip_conntrack_tuple, and may be called as a node chain table, and the size of the table may be MAX_CONNTRAC*2.

Figure 3:
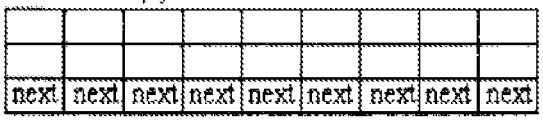
FIG. 3 depicts an example structural schematic view of a Hash table in a method for a mobile terminal to access a network through a cell phone.
Figure 3:
Figure 3:
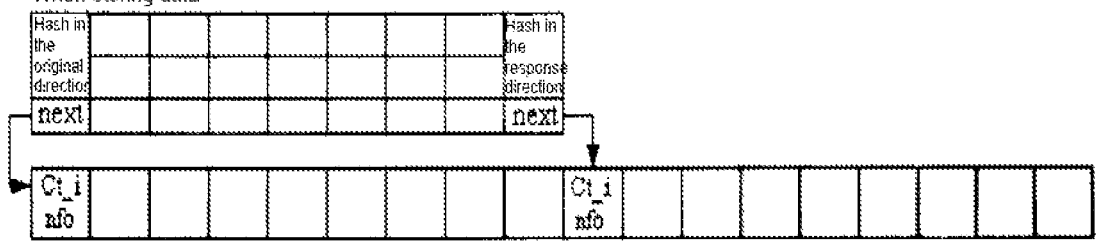
Figure 3:
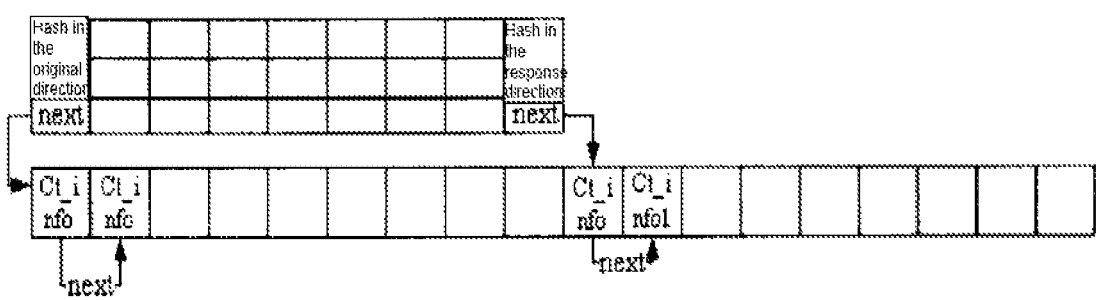

Referring to a Hash table structural view shown in FIG. 3, a header node may be a hash table, and the u_ip_conntrack_tuple may be stored in a large array structure, wherein the size of the table may be 2 times that of the hash table.

When a data packet arrives, an empty u_ip_conntrack_tuple space may be distributed. A response value of the header hash table may be pointed at the current position of the u_ip_conntrack_tuple array. Moreover, the u_ip_conntrack_tuple in the response direction, may be arranged at the position in the original direction after MAX_CONNTRACK is added, and the next pointer of an HASH header node in the response direction may be pointed at this node. When data from the response direction arrives, a response node may be found according to the header hash. Moreover, the original node can be found by subtracting MAX_CONNTRACK from the response node, thus obtaining NAT information that requires translation.

If a hash value of a next=node can be obtained through the header hash, the data packet may be the data packet in the original direction. If the hash value of the storage position of the header hash is different from that of the next position, then the data packet is the data packet in the response direction.

Figure 4:
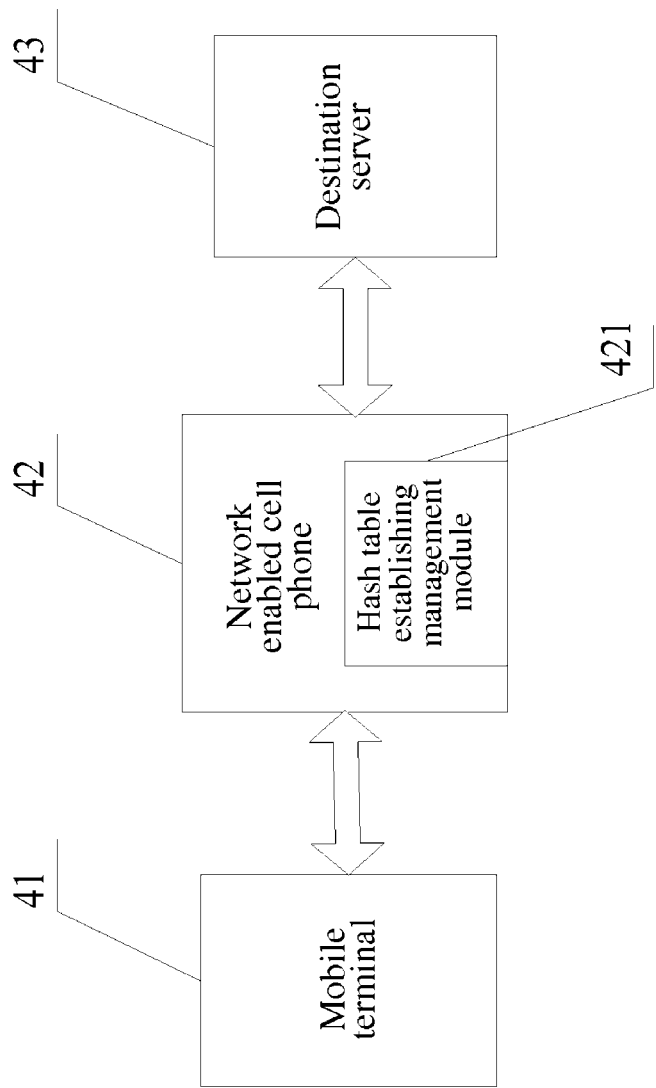
FIG. 4 depicts an example structural view of a system for a mobile terminal to access a network through a cell phone.

Nodes may be dynamically added by adopting a manner of a Hash table, which may greatly reduce searching of conflict chains, may differ from one-by-one searching realized by the traditional bidirectional chain table, and may greatly improve processing speed A method for a mobile terminal to access a network through a cell phone may allow a mobile terminal to access the network through a cell phone. A structural schematic of system for implementing such a method is shown in FIG. 4. The system may include a mobile terminal 41, a network enabled cell phone 42 and a destination server 43.

The mobile terminal 41 may establish a point-to-point communication connection with the network enabled cell phone 42 through WIFI, and may send a data packet of the destination server 43 to the network enabled cell phone 42.

The network enabled cell phone 42 may be used for extracting an element group from a data packet sent by the mobile terminal 41 at a network layer and may save the element group in a tuple structure, wherein the element group may include a source address, a source port, a protocol type, a destination address and a destination port of the data packet. Moreover, the network enabled cell phone may be used for carrying out source address NAT treatment on the element group, translating the source address of the data packet to an IP address for the dial-up networking of the cell phone, distributing a dial-up networking port, and connecting the network enabled cell phone to the destination server 43 to communicate according to information of the treated element group.

The network enabled cell phone 42 may include a Hash table establishing management module 421 that may be used for pre-establishing a connection management Hash table used for tagging a network address mapping relationship in a network enabled cell phone, wherein a Hash value in the connection management Hash table may be equal to a binary sum of a source address, a protocol type, a source port and a destination port.

The destination server 43 may be used for communicated with the mobile terminal 41 and the network enabled cell phone 42.

The network enabled cell phone 42 may be further used for searching the connection management Hash table according to the element group, determining whether a connection structure of the mobile terminal and the destination server exists in the connection management Hash table, defining the data packet as the first data packet, and establishing a new connection structure in the Hash table if the connection structure does not exist in the connection management Hash table.

The network enabled cell phone 42 may be further used for extracting connection management information represented by the connection structure, monitoring whether the current network requires FTP extension monitoring, updating a current connection management status, and carrying out NAT treatment on the data packet to realize communications between the mobile terminal 41 and the destination server 43 if the connection structure exists in the connection management Hash table.

A-method and system for a mobile terminal to access a network through a cell phone may include a mobile terminal connected to a network enabled cell phone via a WIFI connection mode, and the network enabled cell phone may serve as a gateway router. TCP/IP operating principle having element information, such as source address, source port, protocol, destination address and destination port in a data packet, may be processed when a data packet arrives at a network layer of the network enabled cell phone. A Hash table may then be dynamically established for searching the network connection, and NAT treatment may be carried out to the data packet, thus, a mobile terminal may simultaneously access the network with the network enabled cell phone by the external network IP address of the network enabled cell phone. Because the two devices may share an IP address to access the network, all the network flow may be generated at the gateway cell phone, thus, avoiding any utilization cost of other devices. Furthermore, the Hash table may be dynamically established for a data packet, which may accelerate search speed of the data packet and the processing speed.

It should be understood that applications of the claimed invention are not limited to the foregoing examples. A person having ordinary skill in the art may improve or transform the claimed invention according to the foregoing description. All improvements and transformations shall fall within the protection scope of the accompanying claims.

I claim:

1. A method for a mobile terminal to access a network through a cell phone, comprising the steps:
    pre-establishing a connection management Hash table for tagging a network address mapping relationship in the network enabled cell phone, wherein a Hash value in the connection management Hash table is equal to a modulus table length of a binary sum of a source address, a protocol type, a source port and a destination port;
    establishing, by the mobile terminal, a point-to-point communication connection with the network enabled cell phone through WiFi, and sending a data packet of a destination server to the network enabled cell phone;
    extracting, by the network enabled cell phone, an element group from the data packet sent by the mobile terminal at a network layer and saving the element group in a tuple structure, wherein the element group comprises a source address, a source port, a protocol type, a destination address and a destination port of the data packet;
    carrying out, by the network enabled cell phone, NAT treatment on the element group, translating the source address of the data packet to an IP address for dial-up networking of the cell phone, and distributing a dial-up networking port;
    connecting the network enabled cell phone to the destination server to communicate according to information of the treated element group; and
    saving the element group after being subjected to source address NAT treatment in the connection management Hash table in a form of tuple structure.

2. The method according to claim 1, further comprising: searching, by the network enabled cell phone, the connection management Hash table according to the element group, determining whether a connection structure of the mobile terminal and the destination server exists in the connection management Hash table, defining the data packet as the first data packet and establishing a new connection structure in the Hash table if the connection structure does not exist in the connection management Hash table.

3. The method according to claim 2, wherein searching, by the network enabled cell phone, the connection management Hash table according to the element group and determining whether the connection structure of the mobile terminal and the destination server exists in the connection management Hash table, includes extracting connection management information represented by the connection structure, monitoring whether the current network requires FTP extension monitoring, updating a current connection management status, and carrying out NAT treatment on the data packet to realize communications between the mobile terminal and the destination server if the connection structure exists in the connection management Hash table.

4. The method according to claim 3, further comprising: determining whether the data packet is data connection of other FTP control chains according to the new connection structure if a protocol in the element group is an FTP protocol, and carrying out destination address NAT treatment on the element group in the data packet if the data packet is the data connection of other FTP control chains.

5. The method according to claim 1, wherein sending, by the destination server, a returned data packet to the mobile terminal, includes sending the returned data packet to the network enabled cell phone first, extracting, by the network enabled cell phone, the element group in the returned data packet and searching the connection management Hash table to find a corresponding tuple structure, modifying the returned data packet according to the tuple structure and sending the modified returned data packet to the mobile terminal.

6. The method according to claim 1, further comprising: searching, by the network enabled cell phone, the connection management Hash table according to the element group, determining whether a connection structure of the mobile terminal and the destination server exists in the connection management Hash table, establishing a new connection structure in the Hash table if the connection structure does not exist in the connection management Hash table.

7. The method according to claim 6, wherein searching, by the network enabled cell phone, the connection management Hash table according to the element group and determining whether the connection structure of the mobile terminal and the destination server exists in the connection management Hash table, includes extracting connection management information represented by the connection structure, monitoring whether the current network requires FTP extension monitoring, updating a current connection management status, and carrying out NAT treatment on the data packet to realize communications between the mobile terminal and the destination server if the connection structure exists in the connection management Hash table.

8. The method according to claim 7, further comprising: determining whether the data packet is data connection of other FTP control chains according to the new connection structure if a protocol in the element group is an FTP protocol, and carrying out destination address NAT treatment on the element group in the data packet if the data packet is the data connection of other FTP control chains.

9. A method for a mobile terminal to access a network through a cell phone, comprising the steps:
    pre-establishing a connection management Hash table used for tagging a network address mapping relationship in the network enabled cell phone, wherein a Hash value in the connection management Hash table is equal to a modulus table length of a binary sum of a source address, a protocol type, a source port and a destination port;
    establishing, by the mobile terminal, a point-to-point communication connection with the network enabled cell phone through WIFI, and sending a data packet of a destination server to the network enabled cell phone;
    extracting, by the network enabled cell phone, an element group in the data packet sent by the mobile terminal at a network layer and saving the element group in a tuple structure, wherein the element group comprises a source address, a source port, a protocol type, a destination address and a destination port of the data packet;

carrying out, by the network enabled cell phone, source address NAT treatment on the element group, translating the source address of the data packet to an IP address for the dial-up networking of the cell phone, and distributing a dial-up networking port; and connecting the network enabled cell phone to the destination server to communicate according to information of the treated element group.

10. The method according to claim 9, further comprising: searching, by the network enabled cell phone, the connection management Hash table according to the element group, determining whether a connection structure of the mobile terminal and the destination server exists in the connection management Hash table, defining the data packet as the first data packet and establishing a new connection structure in the Hash table if the connection structure does not exist in the connection management Hash table.

11. The method according to claim 10, wherein searching, by the network enabled cell phone, the connection management Hash table according to the element group and determining whether the connection structure of the mobile terminal and the destination server exists in the connection management Hash table, includes extracting connection management information represented by the connection structure, monitoring whether the current network requires FTP extension monitoring, updating a current connection management status, and carrying out NAT treatment on the data packet to realize communications between the mobile terminal and the destination server if the connection structure exists in the connection management Hash table.

12. The method according to claim 11, further comprising: determining whether the data packet is data connection of other FTP control chains according to the new connection structure if a protocol in the element group is an FTP protocol, and carrying out destination address NAT treatment on the element group in the data packet if the data packet is the data connection of other FTP control chains.

13. The method according to claim 9, wherein sending, by the destination server, a returned data packet to the mobile terminal, includes sending the returned data packet to the network enabled cell phone first, extracting, by the network enabled cell phone, the element group in the returned data packet and searching the connection management Hash table to find a corresponding tuple structure, modifying the returned data packet according to the tuple structure and sending the modified returned data packet to the mobile terminal.

14. The method according to claim 9, further comprising: searching, by the network enabled cell phone, the connection management Hash table according to the element group, determining whether a connection structure of the mobile terminal and the destination server exists in the connection management Hash table, establishing a new connection structure in the Hash table if the connection structure does not exist in the connection management Hash table.

15. The method according to claim 14, wherein searching, by the network enabled cell phone, the connection management Hash table according to the element group and determining whether the connection structure of the mobile terminal and the destination server exists in the connection management Hash table, includes extracting connection management information represented by the connection structure, monitoring whether the current network requires FTP extension monitoring, updating a current connection management status, and carrying out NAT treatment on the data packet to realize communications between the mobile terminal and the destination server if the connection structure exists in the connection management Hash table.

16. The method according to claim 15, further comprising: determining whether the data packet is data connection of other FTP control chains according to the new connection structure if a protocol in the element group is an FTP protocol, and carrying out destination address NAT treatment on the element group in the data packet if the data packet is the data connection of other FTP control chains.

17. The method according to claim 9, wherein sending, by the destination server, a returned data packet to the mobile terminal, includes searching the connection management Hash table to find a corresponding tuple structure, modifying the returned data packet according to the tuple structure and sending the modified returned data packet to the mobile terminal.

18. A system for a mobile terminal to access a network through a cell phone, comprising a mobile terminal and a network enabled cell phone, wherein:

the mobile terminal establishes a point-to-point communication connection with the network enabled cell phone through WIFI, and sends a data packet of a destination server to the network enabled cell phone;

the network enabled cell phone is for extracting an element group in the data packet sent by the mobile terminal at a network layer and saving the element group in a tuple structure, wherein, the element group comprises a source address, a source port, a protocol type, a destination address and a destination port of the data packet; moreover, the network enabled cell phone is used for carrying out source address NAT treatment on the element group, translating the source address of the data packet to an IP address for the dial-up networking of the cell phone, and distributing a dial-up networking port; and being connected to the destination server to communicate according to information of the treated element group;

the destination server is used for being communicated with the mobile terminal and the network enabled cell phone; and the network enabled cell phone includes a Hash table establishing management module used for pre-establishing a connection management Hash table used for tagging a network address mapping relationship in a network enabled cell phone, wherein a Hash value in the connection management Hash table is equal to a modulus table length of a binary sum of a source address, a protocol type, a source port and a destination port.

19. The system for a mobile terminal to access the network through a cell phone according to claim 18, wherein the network enabled cell phone is further used for searching the connection management Hash table according to the element group, determining whether a connection structure of the mobile terminal and the destination server exists in the connection management Hash table, defining the data packet as the first data packet and establishing a new connection structure in the Hash table if the connection structure does not exist in the connection management Hash table.

20. The system for a mobile terminal to access the network through a cell phone according to claim 19, wherein the network enabled cell phone is further used for extracting connection management information represented by the connection structure, monitoring whether the current network requires FTP extension monitoring, updating a current connection management status, and carrying out NAT treatment on the data packet to realize communications between the mobile terminal and the destination server if the connection structure exists in the connection management Hash table.

* * * * *